United States Patent Office.

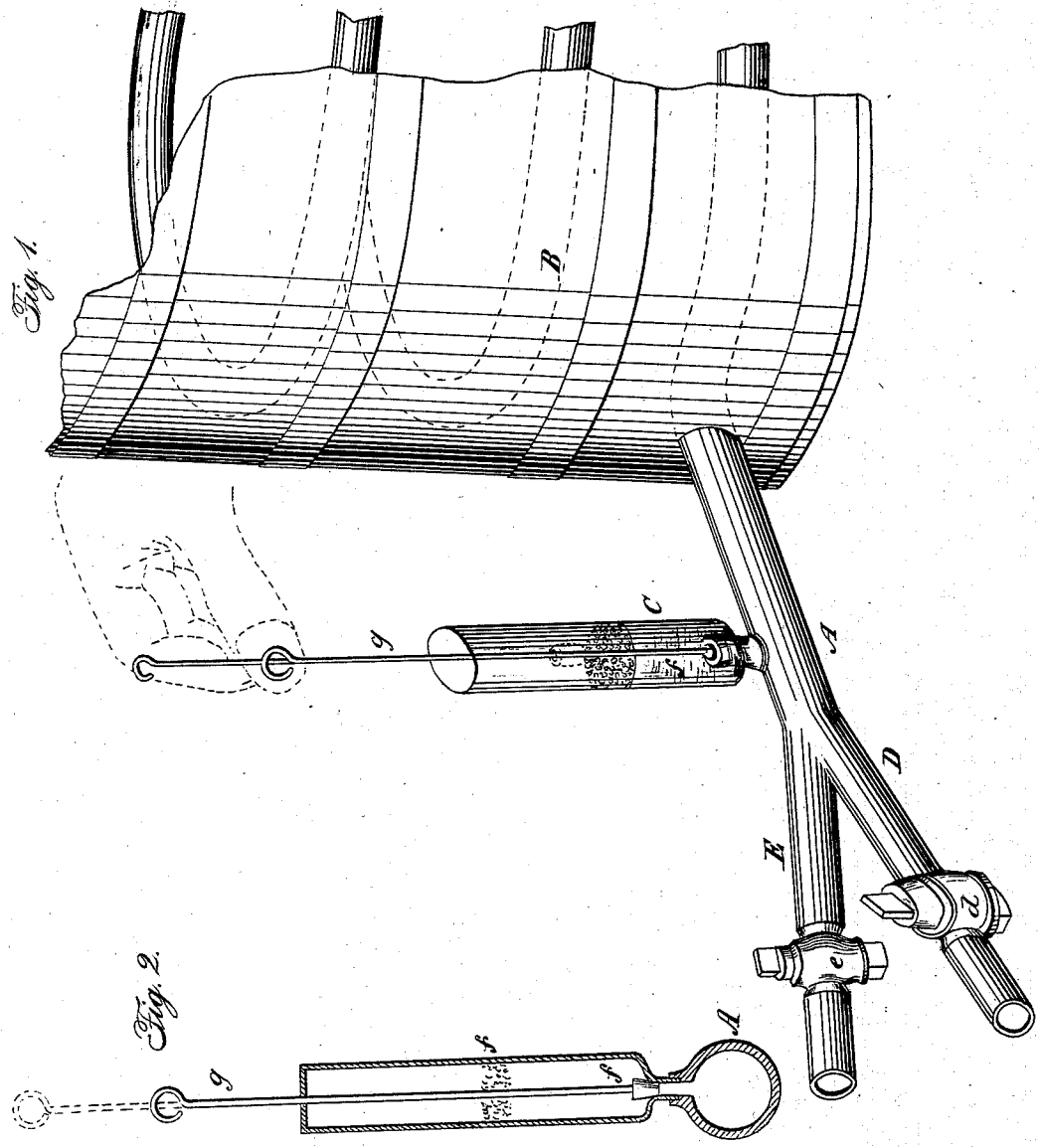

JOHN C. DUNLEVY, OF DAYTON, OHIO.

IMPROVED APPARATUS FOR TESTING SPIRITS AND PREVENTING FRAUDS ON THE REVENUE.

Specification forming part of Letters Patent No. 60,158, dated December 4, 1866.

*To all whom it may concern:*

Be it known that I, JOHN C. DUNLEVY, of the city of Dayton, county of Montgomery, and State of Ohio, have invented a new and improved method of enabling distillers to determine whether the still is running low wines or high wines without having their whisky tubs and pipes so open as to permit the abstraction of whisky therefrom, and to test the proof of spirits without opening their tubs or pipes; and I do declare that the following is a full and exact description thereof, reference being had to the accompanying drawings.

The nature of my invention consists in providing a permanent glass proof tube, attached to the worm leading from the still to the whisky tub, and making branches to the main worm or pipe, furnished with tight stop-cocks, so that shutting the stop-cocks will necessarily fill the proof tube, and by having a cork or stopper inside the proof tube so attached to a wire handle passing through the upper part of the proof tube, so that the spirits therein may be agitated, and then corked up at rest until the "bead" shall indicate the proof.

The following description will enable any one skilled in the arts to make and use my invention. The drawing herewith annexed represents a perspective view of my apparatus attached to the worm of a still.

A is the apparatus, composed of a closed glass vessel, C, connected to the pipe A, so as to fill with spirits from the still when the stop-cocks $d$ and $e$ are closed. In the bottom of the test tube C is a cork, $f$, attached to a rod, $g$. As soon as the tub C fills with a sufficient quantity of spirit to test, it is to be agitated by moving up and down the rod $g$, to which the cork $f$ is attached. The bottom is then closed by the cork, and the "bead" settles in tube C so as to give the proof. The cock D or E is then opened so as to permit the spirits to go either to the high or low wines tank, as is required by the strength indicated. The advantages of my apparatus are that it is very simple, and can be used by distillers in a manner they are already familiar with. It is a perfect protection to the revenue, since all the spirit must pass directly to the high or low wines tank, which may be kept closed and locked as required by law.

Having thus described my invention, what I claim, and desire to secure by Letters Patent, is—

The testing apparatus herein described, composed of the vessel C, with the parts $f$ and $g$, or their equivalents, in combination with the pipe A and the stop-cocks D and E, all substantially as and for the purpose set forth and described.

JOHN C. DUNLEVY.

Witnesses:
QUINCY CORWIN,
JOHN E. KINDER.